United States Patent [19]

Schwartze

[11] 4,288,107
[45] Sep. 8, 1981

[54] TERMINATION CONSTRUCTION OF A CABLE COMPRISED OF BUNDLED TUBES

[75] Inventor: Hansjürgen Schwartze, Osnabrück, Fed. Rep. of Germany

[73] Assignee: Kabel- und Metallwerke Gutehoffnungshutte A.G., Hanover, Fed. Rep. of Germany

[21] Appl. No.: 943,737

[22] Filed: Sep. 19, 1978

[30] Foreign Application Priority Data

Sep. 19, 1977 [DE] Fed. Rep. of Germany ....... 7728990
Mar. 11, 1978 [DE] Fed. Rep. of Germany ....... 2810708

[51] Int. Cl.³ .............................................. F16L 39/00
[52] U.S. Cl. ................................ 285/137 R; 285/381; 285/DIG. 10
[58] Field of Search ........... 285/137 R, 381, DIG. 10, 285/DIG. 7; 174/74 R, 74 A, 75 R, 77 R, 88 R, DIG. 8; 138/111

[56] References Cited

U.S. PATENT DOCUMENTS

| | | | |
|---|---|---|---|
| 1,971,626 | 8/1934 | Simmons | 174/74 R |
| 2,578,280 | 12/1951 | Barnard | 138/111 X |
| 3,254,153 | 5/1966 | Kohler | 285/137 R X |
| 3,395,382 | 7/1968 | Weagant | 174/DIG. 8 X |
| 3,400,737 | 9/1968 | Matthews et al. | 138/111 |
| 3,567,259 | 3/1971 | Benson et al. | 285/381 |
| 3,582,096 | 6/1971 | Norton et al. | 285/137 R X |
| 3,708,611 | 1/1973 | Dinger | 174/DIG. 8 X |
| 3,767,234 | 10/1973 | Weirich et al. | 285/137 R |
| 3,949,110 | 4/1976 | Nakajima et al. | 174/DIG. 8 X |

FOREIGN PATENT DOCUMENTS

| | | | |
|---|---|---|---|
| 576084 | 5/1959 | Canada | 174/77 R |
| 1165122 | 3/1964 | Fed. Rep. of Germany | 174/74 A |
| 1925006 | 4/1970 | Fed. Rep. of Germany | 174/75 R |
| 1149611 | 4/1969 | United Kingdom | 174/74 A |

*Primary Examiner*—Thomas F. Callaghan
*Attorney, Agent, or Firm*—Smyth, Pavitt, Siegemund & Martella

[57] ABSTRACT

The individual tubes are separated from each other at the end of a cable composed of a tube bundle, by means of a cap member having a neck in heat shrink fit on the cable jacket and having an end plate with sleeves through which pass groups of tubes, a plurality of further members have their respective necks heat shrunken onto the sleeves, and individual sleeves on the further members single out and separate the individual tubes of the cable, the latter sleeves being also mounted on the tubes in heat shrink fit. Further features relate to thermal insulation form stability, and pressure proofing of the construction, all destined to seal off the interior of the cable while permitting feed through of the individual tubes for physical fan-out or fan-in.

13 Claims, 4 Drawing Figures

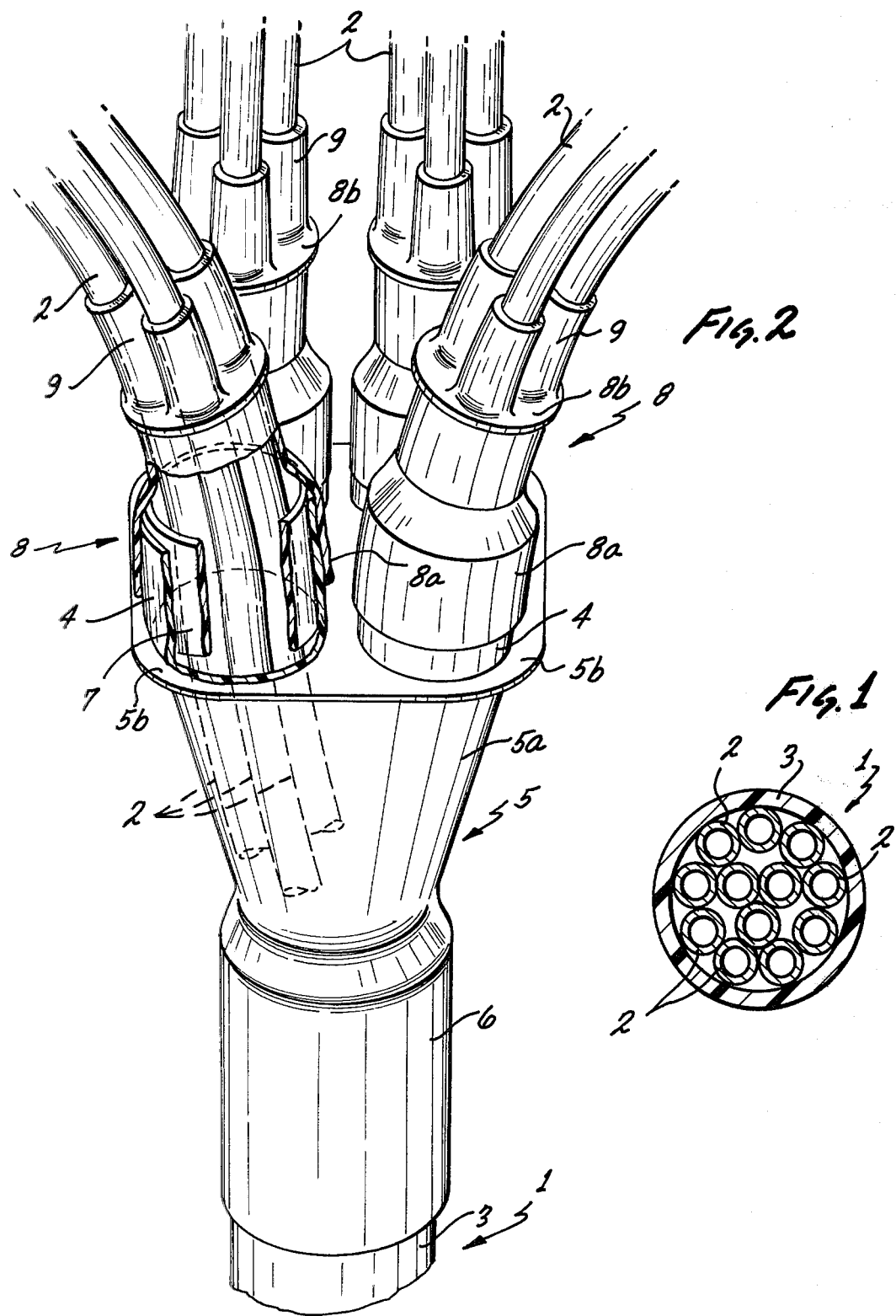

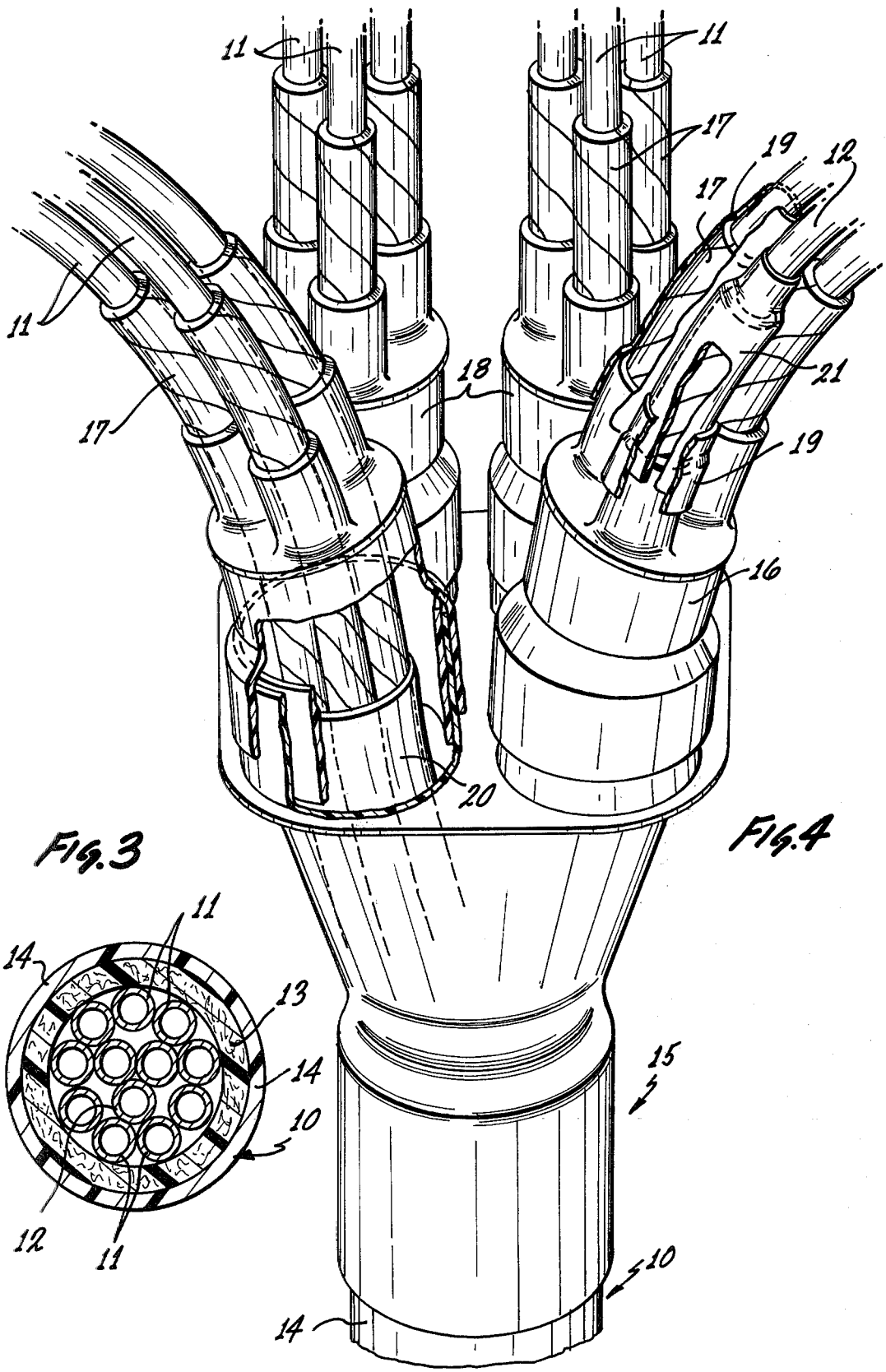

TERMINATION CONSTRUCTION OF A CABLE COMPRISED OF BUNDLED TUBES

BACKGROUND OF THE INVENTION

The present invention relates to moisture impermeable end construction for cable of the type in which the cable core is a bundle of tubes.

Many fields of engineering employ to an increasing extent remote control equipment based on pneumatics or hydraulics. Accordingly, separate conduit means are needed for transmitting different control and measuring pulses, frequently over large distances. It was found suitable to use bundles of tubes being assembled in some fashion, e.g. stranded and each tube establishes one fluid signal transmission path while all tubes together constitute a multi-conduit fluid cable.

By way of example, chemical engineering uses increasingly such fluid cables for the transmission of pneumatic measuring signals or control pulses and/or for sampling gaseous or liquidous substances in a chemical plant. In the case of sampling, it may be desirable to cool or heat the cable. Fluid dynamics is preferred particularly in those cases in which the employment of electrical equipment is deemed too dangerous as defects or malfunctions may cause an explosion.

In most cases one has to provide for physical fan-out and fan-in at the ends of the cable, i.e. the tubes are to be separated from each other, as each tube must be connected to a different piece of equipment or at least to a different inlet or outlet let of such equipment. Each tube may have a different source and a different destination for the fluid passing through. The known cable are disadvantaged by the fact that upon separating the several tubes from the cable bundle for providing the different connections, the interior of the cable bundle outside of each tube, but inside of the jacket enveloping the bundle, is in effect opened up and moisture can readily penetrate the cable from both ends. The moisture may seep in, more or less slowly, but quite consistently, and the cable jacket becomes in effect a water conduit. If the tubes in the jacket are made of metal, they can readily corrode. Moreover, and particularly in a chemical plant, all kinds of substances may be solved in the water conceivably enhencing the corrosion. In many cases, the cable is exposed to ambient weather conditions, which may be quite severe, for example, on ships, tanks, off-shore drilling islands, etc. Also, in the case of heated or cooled cables, moisture may change the heat conduction properties of the cable.

DESCRIPTION OF THE INVENTION

It is an object of the present invention to provide for a construction at an end (or both ends) of a cable being composed of a bundle of tubes in a jacket, which construction prevents penetration of moisture into the cable while permitting access to each individual tube in the bundle for purposes of connecting the tubes individually to equipment constituting source or destination of fluid passing through the respective tube.

It is therefore, an object and feature of the invention to provide a terminal fitting for jacketed tube bundles which seals off the interior of the jacket, but permits feed through of the individual tubes.

In accordance with the preferred embodiment of the invention, a basic construction element or member is proposed, having a tubular neck portion, and an end plate or bottom at one end from which extend individual sleeves. Such a member receives a plurality of tubes being passed into and through the neck portion and being heat shrunken onto the tubes, while one or several tubes pass through each of the several sleeves, also in heat shrink fit. Conceivably, a single member may suffice having its neck provided in heat shrink fit onto the cable jacket, and the tubes of the bundle are passed through the sleeves individually, each sleeve being heat shrunken onto the respective tube. If the number of tubes in the cable is quite large, a staggered separation of the tubes is proposed. A first member has still its neck heat shrunken onto the cable as a whole, but the individual sleeves are passed through by smaller groups of tubes. Additional members are provided having their neck, respectively, heat shrunken onto the sleeves of the first mentioned member, while the sleeves of the individual members are heat shrunken onto and passed through by the individual tubes, to complete the separation. This way, one obtains a two-stage separation of the individual tubes. More than two stages can be used analogously for still larger numbers of tubes. In each case, the neck of a member of a stage is heat shrunken onto a sleeve (or the cable as a whole) of a lower stage, and the final stages in toto comprise members whose sleeves finally separate all of the tubes from each other.

It can thus be seen that the cable end is provided by a construction in which the individual tubes each are externally sealed off the interior of the cable (a) by the heat shrunken sleeves of the final separation stage, (b) by the neck of one member as heat shrunken onto the cable jacket, and (c), possibly, by heat shrink seals of any neck-to-sleeve connections as between different stages in a staggered arrangement. Such an assembly constitutes indeed a fitting that seals the interior of the jacketed tube bundle, and permits each tube to be suitably connected. Due to the sealing of the cable ends, one may now use a material for the tubes that may, in fact, corrode if it were exposed to the environment, but they are not so exposed due to the construction of the invention. Also, the tubes may be thinner because corrosion thickness offset is not needed. Heat shrinking may in each instance be supplemented by a bonding agent, preferably a hot melting adhesive. Such supplemental bonding enhences pressure resistance of the construction as a whole.

The cable as a whole may be thermally insulated, and the individual tubes should now be insulated up to the neck portion that envelopes the unimpaired cable jacket, or up to any supplemented heat insulation enveloping a group of tubes.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a cross-section through a bundle of tubes of a cable of the type to which the invention pertains;

FIG. 2 is a perspective view of a cable end construction in accordance with the preferred embodiment of the invention;

FIG. 3 is a view similar to FIG. 1 but showing a thermally insulated cable with internal heating or cooling; and FIG. 4 is a view similar to FIG. 2 showing supplemental means for retaining thermal insulation.

Proceeding now to the detailed description of the drawings, FIGS. 1 and 2 illustrate a cable 1 which includes twelve bundled tubes 2, possibly having been stranded together about a common axis. The tubes may be made, e.g., of a high grade steel and they serve individually as conduit for flowing substances. The tube bundle is jacketed by means of an outer envelope 3 made, e.g. from polyethylene or of a flame retarding, highly thermally stabilized polyvinylchloride, if the cable is to be used at high temperatures.

The individual tubes 2 of the cable 1 are separated at an end of the cable by means of structure depicted in FIG. 2. This structure provides for a two-stage separation, and includes a first member 5 of tubular, funnel-shaped construction. The member has a tubular neck 6 which has been heat shrunken onto the jacket 3. That jacket extends, e.g. through the neck, but a portion has been removed so that end portions of the individual tubes 2 are no longer held together inside of a funnel-shaped portion 5a of member 5.

The funnel 5a has a top cover 5b which is provided with several portholes, and sleeves 4 extend around and from these ports. The particular device has four such sleeves 4, each of which is traversed by three of the tubes 2. Thus, the member 5 per se provides for a first stage tube separation from the bundle of twelve into four groups of three tubes each.

The sleeves 4 could be heat shrunken directly onto the respective groups of tubes. However, it was found advisable to avoid contour distortion of the sleeves. Therefore, sleeves 7 receive the group or sub-bundle of tubes in each sleeve 4, and the sleeves 4 are then heat shrunken onto the sleeves or tubes 7. These tubes 7 are not made of heat shrinking material, but retain their contour under heat.

The individual tubes 2 are separated from each other and held by means of four members 8, one for each group of tubes, and constituting the second (and final) stage of the separation assembly and cable end fitting. Each member 8 has a tubular portion 8a which fits snugly onto the respective sleeve 4, and is heat shrunken thereon. Each member 8 is provided with a bottom plate 8b from which extend three individual sleeves 9, snugly receiving the three tubes 2 of the respective group and separating them from each other. The sleeves 9 are heat shrunken and, preferably, bonded in addition to the tubes 2 by means of an adhesive, preferably a hot melting adhesive.

Each of the members or caps 8 has also an upper part of smaller diameter; the respective tubes 7 and sleeve 4 extend only into the lower part. The upper part separates the bottom plate 8b from the neck 8a and is oriented to establish an oblique direction for the tubes passing through for aiding in the fan-out or fan-in and separation.

It can readily be seen that in this example the tubes are separated from each other by means of a two-stage separation. If the cable includes a larger number of tubes, e.g. 18 or 24 or even more, it is advisable to provide for additional separation, first into larger groups and then into smaller groups before the tubes are individually separated. In each instance, the neck of a separation member receives a group of tubes and is either heat shrunken onto a sleeve of a preceding stage (such as 4), or on the cable jacket 3. The assembly of FIG. 2 can also be understood to be a unit with a neck 6 and final sleeves 9, singling out and separating the tubes from each other. The multi-stage construction is simply preferred for ease of assembly and to avoid having to make too complex a part.

The shrinking members are preferably made of a thermoplastic polyolefin or of polychloroprene rubber, or of fluorine rubber or silicon rubber or of a cross-linked polyvinylchloride or of a modified and cross-linked plastic with polyolefin base.

The arrangement is assembled in a stepwise process. The end portion of the sleeve 3 about to receive neck 6 may be reduced or recessed and is carefully cleaned to remove any oil or grease. Next, the neck 6 of member 5 is slipped on top and around the cable end while the tubes 2 are threaded through the sleeves 4 in groups of three. The additional tubes or sleeves 7 are put in place, i.e. inserted between the tubes 2 and the respective sleeve 4. Through hot air or flame treatment, one heats at least the parts 4 and 6 of member 5, to thereby shrink the neck 6 onto the jacket 3 and the sleeves 4 onto tubes or sleeves 7. The tubes 7 are not made of heat shrinking material and are provided to cause the sleeves 4 when shrinking to retain their circularity; i.e. the sleeves 4 are not shrunken directly onto the tubes 2 of the respective group. This way, sleeves 4 remain true to shape for placement of the tubular end of the members 8.

The individual tubes are threaded through the sleeves 9 and members 8 are heat shrunken onto the sleeves 4. Since the tubes are made of metal, heat shrinking sleeves 9 onto them may not be adequate for sealing which is the reason for using a supplemental bonding agent to provide a supplemental adhesive bond. Bonding will also ensure that the assembly, i.e. the interior of the cable so connected, remains leak-proof even under pressure. Actually, the interior of all caps or members 5 and 8 may be coated with a hot melting adhesive so that all heat shrinking fits are supplemented by adhesive bonding.

The example of the preferred embodiment shown in FIG. 4 is used when the cable, shown in FIG. 3, is either heated or cooled. The individual tubes should remain thermally insulated even after separation at the cable end.

The cable 10 shown in cross-section in FIG. 3 has eleven individual tubes 11 and the bundle includes a twelfth tube 12, e.g. for a heating medium. Conceivably, more than one tube may be used for heating, particularly if the cable includes many tubes and each tube should not be too far spaced from a heating tube. The bundle is enveloped in a thermal insulation 13 such as a layer of high temperature proof glass fiber tape or ribbon supplemented by several layers of a so-called thermo-fiber fleece ribbon. The insulation 13 is enveloped by an outer jacket made, e.g. of polyvinylchloride, or a high density polyethylene or a synthetic rubber. The tubes 11 and 12 are made of a high grade steel, a copper-nickel alloy, copper or any other suitable material, depending to a considerable extent on the fluid to be conducted and on the thermodynamic conditions for the conduction. In cases one may use thermoplastic tubes, e.g. a tube material on the basis of polytetrafluorethylene. Conceivably, different tubes may be made of different materials in the same cable.

The separation of the tubes at a cable end is depicted in FIG. 4 and is quite similar to the separation technique employed in FIG. 2. The member 15 is of similar construction as member 5 to separate groups of tubes from the bundle, and members 16 separate the individual tubes, just as members 8 do in FIG. 2. Each tube 11, and particularly heating tube 12, must remain thermally insulated. The insulation 13 has been removed to the extent permitting the tubes to be separated in the funnel portion of member 15. Accordingly, each tube is now enveloped by a layer or layers 17 of thermally insulating ribbon, possibly beginning in the funnel of member 15, and extending beyond the individual sleeves 18.

Utilization of sealing shrinking members for the tube separation is of particular importance here. The insulation 17 is positively positioned on the tubes 11 and 12, for example, by tightly wrapping the ribbon in a helical pattern onto the tubes or otherwise. If one uses insulating hoses rather than ribbons 17, these hoses are pushed into the sleeves 18 prior to heat shrinking. In either case, one may use additionally heat shrinking hoses such as 19 on each tubes 11, 12 for surrounding the bare portion, the thermal insulation 17 thereon as projecting from the sleeves 18, as well as these sleeves, to obtain sealing from the otherwise exposed periphery of the tubes up to the separation assembly, as represented in each instance by a member 16. In addition, one may envelope the groups of tubes as passing through sleeves, by means of thermal insulation ribbons or hoses such as 20, to thermally insulate the groups of tubes in member 15.

The thermal insulation 17 has been wrapped upon the bare tubes 11, 12 in each instance. It may be advisable to slip a heat resisting, shrinking hose such as 21 over each these insulated tubes 11, 12 to fix the position of the insulation. Such hoses may be made of Teflon or silicone. Such additional hoses are particularly useful for tubes conducting heating fluid, so that the outer shrinking hose (19) which provides the sealing, does not engage directly the hot tube.

It can thus be seen that the cable end is made moisture-proof to prevent ingress of water and other corroding substances, and the tubes remain thermally insulated up to the point of connection.

A particular modification should be mentioned in that one of the sleeves 9 may be provided in excess of the number needed for the tubes 2, 11 and/or 12. This sleeve may receive a safety valve being heat shrunk into that sleeve. The valve may be used to equalize the pressure in the interior relative to the exterior of the cable. Such pressure equilization is particularly needed if the cable is heated.

The invention is not limited to the embodiments described above but all changes and modifications thereof not constituting departures from the spirit and scope of the invention are intended to be included.

We claim:

1. In a construction for placement at an end of a bundle of tubes, a member having a neck portion placed in shrink fit onto the bundle, the member having a bottom plate from which extend a plurality of different sleeves, each said sleeves being passed through by at least one of said tubes, said sleeves being placed in shrink fit around and on the respective tube or tubes.

2. In a construction as in claim 1, including a thermally insulating envelope around all of the tubes within any of said sleeves.

3. In a construction as in claim 1, including bonding layers disposed for supplementing at least one of said shrink fits.

4. A terminal construction for an end of a cable, the cable being comprised of a bundle of tubes in an outer jacket, the construction comprising:
a member having a neck portion heat shrunken onto the jacket;
a flared portion extending from the neck, receiving and being passed through by the tubes, said tubes having been separated from each other, the jacket having been removed from the cable in the flared portion;
a bottom plate end-sealing the flared portion; and
a plurality of sleeves extending from the bottom plate, each receiving and being passed through by at least one of the tubes and in heat shrink fit thereon.

5. In a construction as in claim 4, and including a plurality of additional members each having a neck mounted in heat shrink fit onto one of the sleeves of the plurality of sleeves, each of said sleeves being passed through by more than one of the tubes, each additional member having several sleeves respectively receiving one of the tubes in heat shrink fit.

6. In a construction as in claim 5, including a plurality of additional tubes respectively interposed between the sleeves of the plurality of sleeves and the tubes passing through, the sleeves being heat shrunken onto the additional tubes.

7. In a construction as in claim 5, including thermal insulation around each of the tubes.

8. The construction as in claim 2 or 7, the envelope being a fleece-like ribbon wrapped around the tubes.

9. A terminal construction for a group of bundled tubes held together in a tubular element, comprising:
a tubular member, being heat shrunken onto the tubular element;
a bottom plate on the tubular member; and
a plurality of sleeves extending from the tubular member, each receiving and being passed through by at least one of the tubes and being disposed in heat shrunk fit thereon.

10. A terminal construction for a large bundle of tubes being enveloped in a jacket, comprising:
a plurality of tubular members each having a neck portion, an end plate, and a plurality of sleeves extending from the end plate, whereby neck portions of several of the members are placed in heat shrink fit onto the sleeves of another one of the members, the neck portion of each member being passed through by at least one of the tubes;
one of the members having its neck placed in heat shrink fit onto the envelope of the cable, all said tubes passing into and through the neck of said latter one member; and
several of said members excluding at least said one member each having their sleeves provided in heat shrink fit onto just one of said tubes.

11. A construction as in claim 10, said tubes being individually thermally insulated.

12. A construction as in claim 10, wherein the tubes as passing through any of the sleeves of the one member being held in a particular tube, the respective sleeve being heat shrunken onto the particular tube, the neck portion of one of the several members being heat shrunken onto the respective sleeve.

13. The construction as in claims 1, 4, 9, or 10, wherein the shrinking member or members are made from one of the following materials: thermoplastic polyolefin; crosslinked polyvinyl chloride; a crosslinked polyolefin, polychloroprene rubber, fluorine rubber or silicon rubber.

* * * * *